United States Patent [19]

Denizou

[11] Patent Number: 4,717,533
[45] Date of Patent: Jan. 5, 1988

[54] GRID FOR NUCLEAR FUEL ASSEMBLY

[75] Inventor: Jean P. Denizou, Craponne, France

[73] Assignee: Framatome et Cogema, France

[21] Appl. No.: 766,657

[22] Filed: Aug. 19, 1985

[30] Foreign Application Priority Data

Aug. 24, 1984 [FR] France .................................. 84 13195

[51] Int. Cl.⁴ .............................................. G21C 3/34
[52] U.S. Cl. ..................... 376/441; 376/438; 376/462
[58] Field of Search ............... 376/436, 438, 441, 442, 376/462

[56] References Cited

U.S. PATENT DOCUMENTS

| | | | |
|---|---|---|---|
| 3,068,163 | 12/1962 | Currier, Jr. et al. | 376/442 |
| 3,158,549 | 11/1964 | Fowler | 376/442 |
| 3,352,758 | 11/1967 | Anthony | 376/438 |
| 3,369,973 | 2/1968 | Voigt . | |
| 3,953,285 | 4/1976 | Martini et al. | 376/438 X |
| 3,996,102 | 12/1976 | Thome | 376/462 |
| 4,312,706 | 1/1982 | Snyder, Jr. et al. | 376/438 X |

FOREIGN PATENT DOCUMENTS

| | | | |
|---|---|---|---|
| 0065613 | 1/1982 | European Pat. Off. . | |
| 2509078 | 1/1983 | France | 376/442 |

Primary Examiner—John F. Terapane
Assistant Examiner—John S. Maples
Attorney, Agent, or Firm—Larson and Taylor

[57] ABSTRACT

A grid for supporting and spacing nuclear fuel rods, particularly at the nodes of a triangular array, has a peripheral frame of regular polygonal, typically hexagonal, shape and at least two beds of wires spaced in the longitudinal direction of the fuel assembly. Each bed has at least two series of mutually parallel wires secured to said frame at the end thereof, the wires of a same one of said series being parallel to two opposed side of said frame and all said wires defining passages for said fuel elements.

11 Claims, 13 Drawing Figures

U.S. Patent  Jan. 5, 1988  Sheet 1 of 3  4,717,533
FIG. 1.
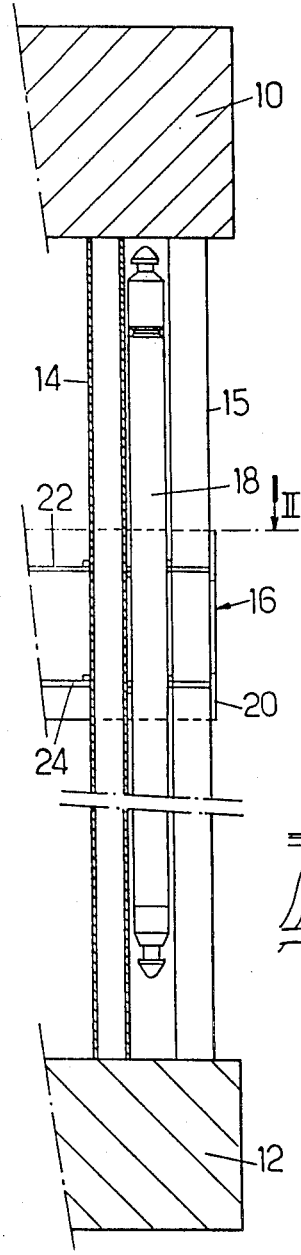
FIG. 2.
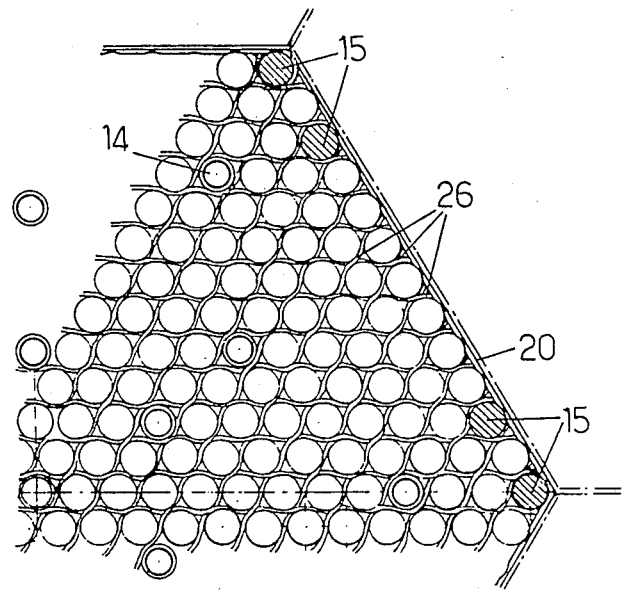
FIG. 3.

GRID FOR NUCLEAR FUEL ASSEMBLY

FIELD OF THE INVENTION

The invention relates to nuclear reactor fuel assemblies of the type incorporating a cluster of fuel rods (also known as fuel elements) arranged in a regular network and held in position by grids distributed and spaced apart along the assembly. The invention relates more particularly to grids for such assemblies comprising a peripheral girdle frame and at least two series of parallel elements defining openings for fuel rods therethrough and elements substituted therefor at certain points of the network.

Although the invention is general in scope, it is particularly suitable for use in fuel assemblies in which the fuel rods are disposed in a triangular network with a pitch which is only slightly greater than the diameter of the fuel rods. The use of such a triangular network is desirable for an undermoderated reactor core since the amount of moderating coolant between adjacent rods must be small, while the required coolant flow should be passed and the coolant streams should mix without an excessive pressure loss.

PRIOR ART

The grids for nuclear fuel assemblies used in water cooled and moderated reactors are generally provided for retaining the rods at the nodes of a square lattice. They comprise a girdle and two sets of mutually orthogonal plates. A fuel assembly described in U.S. Pat. No. 3,068,163 comprises grids for holding the rods at the nodes of a square lattice. Each grid comprises a straight or undulating strip passing between the rods. The strips interengage at the crossing points. If used in a fuel assembly with a "close" pitch, that design would not ensure passage of the coolant flow under satisfactory conditions, mixture of the different streams and an acceptable pressure loss. French patent No. 2,509,078 discloses a spacing grid with a square network which differs from that described in the above-mentioned U.S. patent in that the orthogonal strips for holding the rods are superimposed and connected together by split tongues. A close pitch cannot be adopted with this solution either.

There is disclosed in U.S. Pat. No. 3,158,549 (Fowler) a fuel assembly having fuel rods retained by grids each having cross wires so located that each gridwork provides three of more wires in contact with each fuel elements. However, that arrangement is not sufficient for safely and accurately maintaining the fuel elements in position without impressing an excessive head loss to the coolant flow.

SUMMARY OF THE INVENTION

It is an object of the invention to provide a nuclear fuel assembly grid for resiliently and efficiently holding the rods in position which however causes a relatively low pressure loss, which ensures good mixing of the fluid streams and which represents a small amount of neutron absorbing material.

For that purpose, there is provided a spacing grid comprising a peripheral girdle or frame and at least two series of parallel wires defining passage pockets for the rods. The parallel wires are distributed into at least two beds spaced apart in the longitudinal direction of the assembly and each comprising at least two series of intersecting wires whose ends are fixed to the girdle.

When a grid of the invention is used in a fuel assembly with a triangular lattice, each side of the triangular lattice will be parallel to the wires of at least one series. The wires of each bed may provide either two supporting points per rod, the wires of two successive beds providing to a same rod support points at diametrically opposite positions, or four support points per rod. For mixing the coolant streams, each bed may typically comprise two series of wires, the wires of one of the series of each bed forming an angle of 60° with the wires of the two series of the preceding or following bed. Thus swirls are created. If the beds have a distribution which is reproduced cyclically, an overall flow having an helical shape is induced.

The term "wire" should be interpreted as meaning an elongated element, whose cross section has in all its directions a dimension of the same order of magnitude less by several orders of magnitude than its length so that this element is deformable in all directions. A wire will generally have a circular section. However, ovalized or flattened sections may also be used.

The invention will be better understood from the following description of particular embodiments given by way of examples.

SHORT DESCRIPTION OF THE DRAWINGS

FIG. 1 is a partial and schematical view, in elevation, of a fuel assembly implementing the invention;

FIG. 2 is a partial sectional view along line II of FIG. 1, the contour of adjacent assemblies being shown schematically with dot dash lines;

FIG. 3 is an enlarged detail view of a fraction of FIG. 2;

Figure 4:
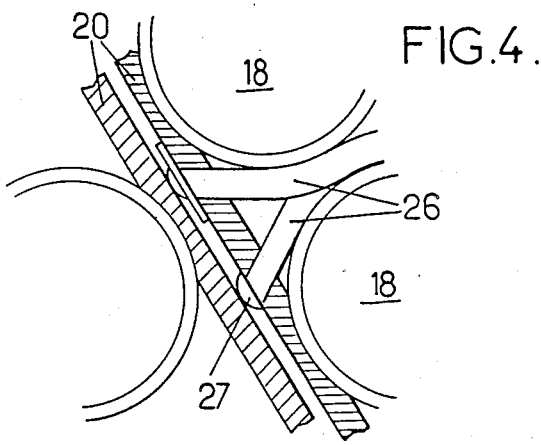
FIGS. 4 and 5 are enlarged detail views showing a possible connection of the wires to a grid girdle which is flat (FIG. 4) or corrugated at the pitch of the rods (FIG. 5)
Figure 6:
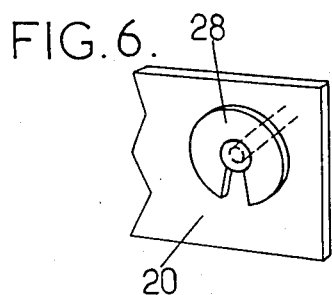
Figure 7:
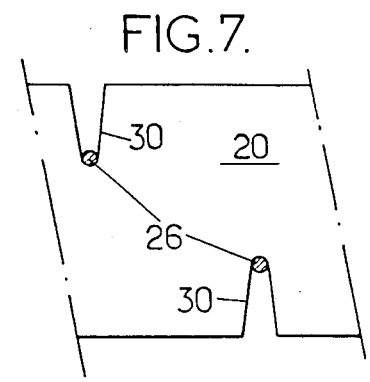
Figure 8:
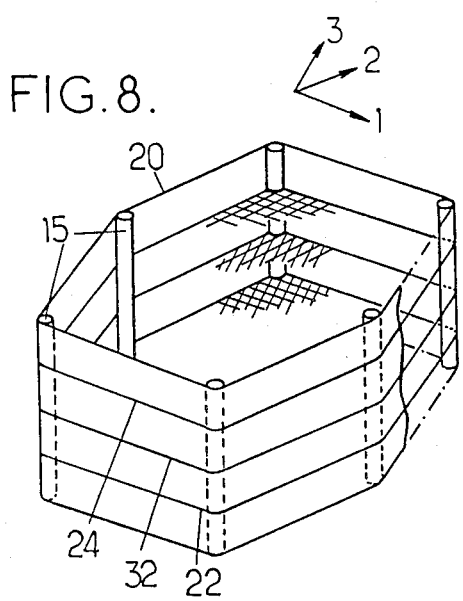
Figure 10:
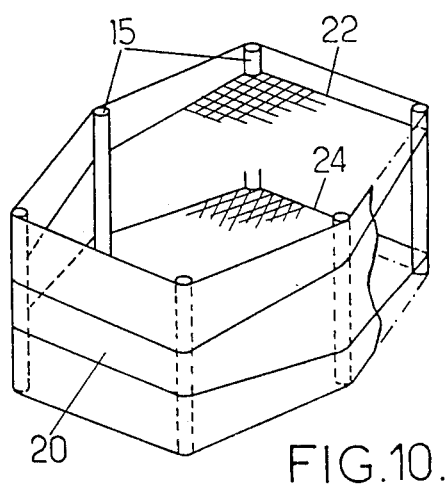
Figure 9:
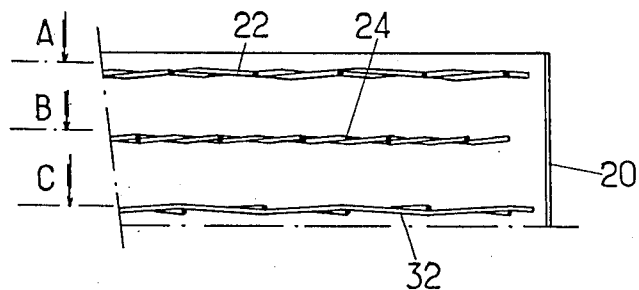
Figure 9:
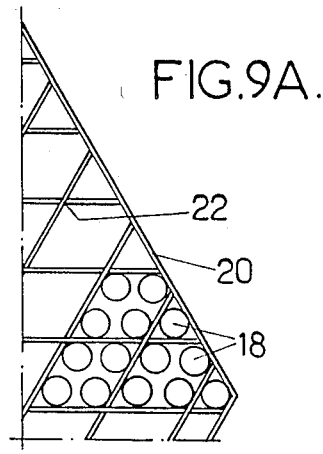
Figure 9:
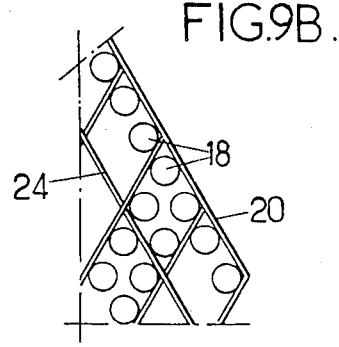
Figure 9:
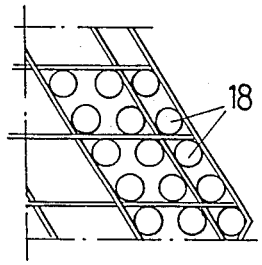

FIGS. 6 and 7, similar to FIG. 4, show other possible connection of the wires;

FIG. 8 is an isometric diagrammatic view of a grid with three beds of wires;

FIG. 9 is a schematical view, in section through a vertical plane, of a grid with three beds of wires;

FIGS. 9a, 9b and 9c are views in partial cross-section along planes A, B and C of FIG. 9;

FIG. 10 similar to FIG. 8, shows a grid with two sloping beds of wires.

DETAILED DESCRIPTION OF PREFERRED EMBODIMENTS

Referring to FIG. 1, those components relating to the invention of a nuclear fuel assembly are shown. The fuel assembly comprises an upper end piece 10 and a lower end piece 12 connected together by elongated cylindrical elements 14 and 15. The elongated elements 14 and 15 are fixed to a plurality of grids 16 spaced apart along the assembly. The grids hold the fuel rods in a regular polygonal network.

The assembly as shown has a hexagonal overall cross-section and the grids hold the fuel rods 18 in position at locations distributed at the apexes of equilateral triangles whose sides are parallel to the side plates which form the girdle or frame 20 of grid 16. Some locations of the network are not occupied by rods 18 but by the elongated elements 14 which may form guide tubes. Other elongated elements 15, situated at the periphery of the network, are fixed to the girdles 20 so as to form a framework of the assembly. The elements 15 may be rods or tubes.

Each grid 16 comprises a plurality of mutually parallel beds of wires for holding the fuel rods in position and spacing them, fixed to girdle 20 and offset in the longitudinal direction of the assembly. As shown in FIG. 1, grid 16 has two beds of wires, perpendicular to the longitudinal axis of the assembly. Each bed consists of two series of mutually parallel wires. The wires of one of the series forming bed 24 are at 60° from the wires of the two series of bed 22. The wires of the other series of bed 24 are therefore parallel to the wires of one of the series of bed 22.

In the embodiment shown in FIGS. 2 and 3, the girdle is formed from flat plates to which are fixed the two beds of wires which are either undulating or are tensioned so as to be better applied against the rods and thus generate holding forces. The wires of the two series may be connected together at the crossing points, for example by welding. The plates forming the girdle are fixed, generally by welding, to the elongated elements 15, three in number for each face of the grid in the embodiment shown in FIGS. 2 and 3. The girdle may be made of "Inoconel" or from stainless steel whereas the wires will typically be made from hyper cold drawn stainless steel, although other materials are suitable. The diameter of the wires will vary depending on the pitch of the network and the diameter of the fuel rods: a wire diameter of about 0.6 mm is often of advantage.

In a modified embodiment, the wires are fixed to the elongated elements 14, for example by engaging the wire ends in grooves or notches in these elements. The elongated elements 15 may then either be kept or omitted.

The reactor coolant will pass through each bed of wires, around a fuel rod, essentially through two passages of generally triangular shape, as shown at a in FIG. 3. Two successive passages associated with the same rod are offset by 60° when passing from one bed to the next, whether there are two beds 22 and 24 (FIG. 1) or more. Thus stirring and mixing of the different coolant streams is obtained with temperature homogeneization.

The ends of the interlaced wires which form the beds are fixed to girdle 20. Numerous types of connection may be used and those which will now be described only form examples thereof which are preferable in most cases.

Figure 5:
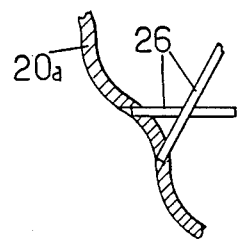

Referring to FIG. 4, the ends of wires 26 are engaged in openings in the girdle, then locked by thermal deformation giving rise to a small boss 27. The connection may be completed by brazing. FIG. 5 shows how the same method of fixing may be applied to a grid comprising a girdle 20 having corrugations at the pitch of the rods. A split washer 29, or circlip, may be engaged on the wire before thermal deformation and brazing, for completing retention thereof (FIG. 6 and wire at the top of FIG. 4).

In FIG. 4 it can be seen that the outer bosses resulting from the thermal deformation form stops for the reciprocal spacing of the fuel assemblies at the height of the grids. The reciprocal bearing points of the peripheral bosses form stops which provide radial maintenance avoiding deformation during operation in the core of the reactor. The use of circlips 28 for mounting and fixing the wires to the girdle plates means that different materials not weldable together may be used for forming the girdle on the one hand, and the wires on the other and thus allows the girdle to be made from a material chosen for its low neutron absorption.

Another solution, which may be used when the grid only comprises two beds of wires or for the endmost beds of grids comprising more than two beds, is shown in FIG. 7: the ends of the wires are jammed in notches 30 in the girdle 20 before being thermally deformed and/or brazed.

Whereas the grid shown in FIGS. 1 comprises only two beds of wires, the one shown in FIG. 8 comprises three parallel beds. If we designate by 1, 2 and 3 three directions at 60° from each other (FIG. 8), the wires of the first bed are in directions 1 and 2, those of the second bed in directions 2 and 3 and those of the third bed in directions 3 and 1. The small dimension of the wires reduces the pressure loss. The mixture is improved because, in two successive beds, half of the wires are orientated differently. The passages a (FIG. 3) will be offset by 60° when passing from one bed to the next. The successive grids provided along the whole of the assembly may be disposed so that the coolant passages are aligned along the same helix or following helical elements in a quincunx arrangement.

Whereas in the case illustrated in FIGS. 3 and 4, each bed provides three pinpoint supports per rod, which results in the case of a grid of the kind shown in FIG. 8 in three pairs of double bearing points spaced apart over the periphery, the grid shown in FIGS. 9, 9A, 9B and 9C only provides two pin point supports per rod in each bed. For that, the wires of each series have a spacing double that of the wires of FIG. 3. But the wires parallel to the same direction in two different beds are offset by a half pitch, so that all the rods have the same number of bearing points (three double bearing points per rod in the case of three beds). This arrangement increases the coolant passage section offered by each bed and allows the number of beds to be increased while limiting the pressure loss to an acceptable value.

Instead of disposing the beds parallel to each other, they may be given different slopes with respect to the longitudinal axis of the assembly. This solution, one embodiment of which is shown in FIG. 10, further improves the mixing of the coolant streams and more especially allows a fraction of the flow to be diverted from one assembly towards the peripheral assemblies.

Several methods of mounting may be used for forming the assembly. A first solution, which may be used more especially when the wires are previously undulated and do not comprise an excessive tension, consists in aligning them in a skeleton then fitting the guide tubes and the rod. Another solution, which allows the wires to be tensioned before final fixing, consists in mounting the wires in the grids while fixing them at only one end, the other being simply inserted in the opposite plate of the grid and held without tensioning. Once the rods are positioned, the wires are subjected to a calibrated traction force then secured.

I claim:

1. A spacing grid for a longitudinal nuclear fuel assembly having a bundle of parallel fuel elements arranged in a regular triangular array, said grid having a peripheral frame of regular hexagonal shape consisting of six side plates and at least two beds of wires spaced in a longitudinal direction, each of said beds having only two separate series of mutually parallel wires, said wires having ends secured to said frame, the wires of a same one of said series being parallel to two opposed sides of said frame, all said wires defining passages for supporting said fuel elements and said beds including at least one respective series of wires parallel to each side of said frame.

2. A spacing grid according to claim 1, wherein said wires in each bed provide two support points for each fuel rod and the wires of two different beds in the grid provide two diametrically opposite support points to a same one of said fuel rods.

3. A spacing grid according to claim 1, wherein the wires in each of said beds provide four supporting points for each fuel rod.

4. A spacing grid according to claim 1, wherein said wires of the two series in each of said beds bind at the crossing points thereof.

5. A spacing grid according to claim 1, wherein end portions of said wires are passed in openings of said peripheral frame and are thermally deformed against the outer surface of said frame, whereby projecting bosses for contact between adjacent fuel assemblies are formed.

6. A spacing grid according to claim 1, wherein end portions of said wires are engaged into openings of said peripheral frame and brazed.

7. A spacing grid according to claim 1, wherein said side plates are corrugated at the same pitch as said array.

8. A spacing grid according to claim 1, wherein successive ones of said beds are at different angles with a longitudinal axis of said grid.

9. A nuclear fuel assembly having:
- a framework including end nozzles and elongated members connecting said end nozzles,
- a bundle of parallel fuel elements arranged in a regular triangular array between said end nozzles,
- and a plurality of separate spacing and retaining grids distributed along said bundle and connected to at least some ones of said elongated elements,
- wherein each of said grids has a peripheral frame of regular hexagonal shape and at least two beds of wires spaced in a longitudinal direction along said frame, each of said beds having only two separate series of mutually parallel wires whose end portions are secured to said frame, the wires of a same one of said series being parallel to two opposed sides of said frame and all said wires defining passages for supporting said fuel elements, said beds including at least one respective series of wires parallel to each side of said frame.

10. A fuel assembly according to claim 9, wherein each of said fuel elements and said wires define a coolant flow passage in each of said beds and wherein said flow passages associated with a same one of said fuel elements are helically disposed along the fuel element.

11. A nuclear fuel assembly having:
- a framework including end nozzles, and elongated members connecting said end nozzles,
- a bundle of parallel fuel elements arranged in a regular triangular array between said end nozzles, said elongated members being substituted for some of said fuel elements in said array,
- and a plurality of separate spacing and retaining grids distributed along said bundle and connected to at least some ones of said elongated elements,
- wherein each of said grids has a peripheral frame of regular hexagonal shape and at least three beds of wires spaced in a longitudinal direction, each of said beds having only two separate series of mutually parallel wires whose end portions are secured to said frame, the wires of a same one of said series being parallel to two opposed sides of said frame, with the six total series having a respective two series parallel to each of the three opposed sides, and all said wires defining passages for said fuel elements, the wires in each of said beds defining openings each traversed by a set of four fuel elements each having two contact points with the wires of the respective bed and each fuel element having six contact points distributed at equal intervals with the wires in a grid.

* * * * *